United States Patent [19]
Heiser

[11] 3,779,800
[45] Dec. 18, 1973

[54] COATINGS CONTAINING PLASTIC PIGMENTS

[75] Inventor: Edward J. Heiser, Midland, Mich.

[73] Assignee: The Dow Chemical Company, Midland, Mich.

[22] Filed: May 27, 1968

[21] Appl. No.: 732,100

[52] U.S. Cl......... 117/155 UA, 260/8, 260/17.4 ST, 260/29.6 RB, 260/29.6 WA, 260/29.7 UA
[51] Int. Cl. ......................... D21h 1/28, C08f 33/08
[58] Field of Search............. 260/17.4 ST, 29.6 RU; 117/155 U, 161 UH

[56] References Cited
UNITED STATES PATENTS

| | | | |
|---|---|---|---|
| 2,976,182 | 3/1961 | Caldwell et al. | 117/135.5 |
| 3,311,582 | 3/1967 | Sparks et al. | 260/29.4 |
| 3,265,767 | 8/1966 | Caldwell et al. | 260/883 |
| 2,755,260 | 7/1956 | Stilbert et al. | 260/17.4 |
| 2,912,392 | 11/1959 | Stilbert et al. | 260/17.4 |
| 2,912,393 | 11/1959 | Stilbert et al. | 260/17.4 |
| 2,912,394 | 11/1959 | Stilbert et al. | 260/17.4 |
| 3,162,543 | 12/1964 | Wilkins | 117/76 |
| 3,276,899 | 10/1966 | Muhlberg et al. | 117/76 |
| 3,281,267 | 10/1966 | Rice | 117/155 |
| 3,409,568 | 11/1968 | Holladay et al. | 260/8 |
| 3,428,582 | 2/1969 | Deex | 260/8 |

FOREIGN PATENTS OR APPLICATIONS 712,219   7/1954   Great Britain

*Primary Examiner*—Melvin Goldstein
*Attorney*—Griswold and Burdick, Richard G. Waterman, L. J. Dankert and I. A. Murphy

[57] ABSTRACT

A retain weight coating comprising a convenient binder such as starch and small colorless plastic particles which remain discrete and retain a diameter of about one wavelength of visible light. The coating, prepared by dispersing the plastic particles in an aqueous media containing the binder, may then be applied to a paper substrate in a conventional manner.

2 Claims, No Drawings

COATINGS CONTAINING PLASTIC PIGMENTS

BACKGROUND OF THE INVENTION

This invention relates to lightweight paper coatings having high opacity and visual gloss. More particularly, it relates to lightweight coatings containing discrete plastic particles having a size ranging from about 0.3 to about 0.8 micron.

Most paper surfaces require a coating in order to have good printing qualities and sufficient opacity or hiding power. Conventional paper coatings contain inorganic pigments such as kaolin clay or titanium dioxide to give the coated substrate the opacity required. These inorganic pigments substantially increase the coating weight which in turn increase the cost of mailing substrates so coated.

Paper coatings which contain bubbles as substitutes for inorganic pigments have been described in U.S. Pat. No. 3,108,009. These coatings are prepared by dispersing a high boiling immiscible liquid in the binder media and then evaporating the dispersed liquid after the coating has been applied to the substrate. It is desirable in the exercise of this method to recapture the evaporated liquid in order to reduce the costs of the coating. Also, according to this method it is preferable to apply a layer of varnish to the coating containing the air spaces to make the surface more suitable for printing.

Paper containing expanded microspheres of plastics has been described in U.S. Pat. No. 3,293,144, but these expanded microspheres are considerably larger than a wavelength of visual light. Generally this kind of paper is used primarily in areas where a high degree of opacity is not required.

SUMMARY OF THE INVENTION

An object of this invention is to provide a light weight coating which upon application to a paper substrate yields a surface which has printing qualities comparable to a surface coated with an inorganic pigment.

Another object is to produce a coating which upon application to the paper substrate yields a level surface having a high visual gloss.

An even further object is to produce a coating which upon application to a paper substrate yields a surface that is not subject to cracking or picking during the printing process.

Other objects and advantages of the invention will be evident from the following description.

The objects of this invention have been accomplished by applying a novel improved coating to a suitable substrate, said coating comprising a suitable binder and discrete, substantially spheroidal plastic particles having an average diameter ranging from about 0.3 micron to about 0.8 micron, said particles being substantially insoluble in the binder at temperatures necessary to finish the coated surface and said particles remaining discrete and retaining a size of about 0.3 to about 0.8 micron during the finishing process.

The practice of this invention using a plastic pigment produces a coated substrate which has a level, unpocked surface at a considerably decreased coating weight while obtaining substantially the same brightness, opacity and printing qualities as provided by the same kind of substrate having an adherent coating containing a conventional inorganic pigment and using the same pigment binder.

DESCRIPTION OF PREFERRED EMBODIMENTS

The discrete plastic particles required by the coating compositions of this invention consist of organic, thermoplastic, resinous polymers that are water insoluble and substantially colorless. It is critical that the polymer of the particles is not soluble in the particular binder utilized in the coating composition. The most critical requirements of the particles are that they be substantially spheroidal, have an average diameter in the range of from about 0.3 to 0.8 micron, and remain discrete throughout the coating process.

In order that the particles retain the discrete character necessary to give optimum light scattering, the particular polymer chosen must not be film forming at the temperatures selected to dry or finish the coated surface. While this temperature requirement varies with the type of finishing method used, it is preferred that the plastic particulate not be film forming at temperatures of 140°F or less if the surface is to be finished by processes such as calendering or supercalendering. If the particles are permitted to fuse or coalesce during the coating process, the light scattering properties of the surface will be reduced substantially. For the same reasons it is also necessary to choose plastic particles which are not softened by the particular binder chosen.

The preferred plastic pigment particles consist of polymers having a Vicat Softening Point, as defined and determined in ASTM Standard D-1525-65T, of greater than about 140°F. and an especially preferred class are such polymers which are predominantly hydrocarbon.

Examples of suitable organic materials for the plastic particles required in the practice of this invention are the polymonovinylidene aromatics such as polystyrene, poly($\alpha$-methylstyrene), poly(4-methylstyrene), poly(2-methylstyrene), poly(3-methylstyrene), poly(4-methoxy-styrene), poly(2-hydroxymethylstyrene), poly(4-ethylstyrene), poly(4-ethoxystyrene), poly(3,4-dimethylstyrene), poly (2-chlorostyrene), poly(3-chlorostyrene), poly(4-chloro-3-methylstyrene), poly(4-tert-butylstyrene), poly(2,4-dichlorostyrene), poly(2,6-dichlorostyrene), poly(2,5-difluorostyrene) and poly(1-vinylnaphthalene); the polyolefins and polyhalo-olefins such as polyvinyl chloride, poly(3-cyclohexyl-1-propene), poly(vinylcyclohexane), poly(hexafluoropropylene),poly(3-o-methylphenylpropene), polyethylene, polypropylene, poly(1-butene), poly(1-pentene), poly (3,3-dimethyl-1-butene), poly(5,5-dimethyl-1-hexene), and poly(3-methyl-1-butene), polyvinylidene chloride, poly(1,2-difluoroethylene), and the like; esters of $\alpha,\beta$-ethylenically unsaturated acids such as polymethacrylates, polychloroacrylates, and polychloromethacrylates, e.g. poly(methyl methacrylate), poly(2-chloroethyl methacrylate), poly(isopropyl methacrylate), poly(cyclohexyl chloroacrylate), poly(ethyl chloroacrylate), poly(isobutyl chloroacrylate), poly(isopropyl chloroacrylate), and poly(methyl chloroacrylate); and other polyesters such as poly(ethylene 1,5-naphthalate), poly-ethylene terephthalate, polyvinyl acetate, polyallyl acetate, polyvinyl propionate, and the like. Copolymers of the constituent monomers of the above-named polymers also are suitable.

Small amounts, such as up to about 20 per cent, of various other copolymerizable neutral monomers such as conjugated diethylenically unsaturated monomers, alkyl acrylates, the acrylonitriles, and the like may be present as comonomers in the aforementioned suitable polymers. Examples of such conjugated diethylenically unsaturated monomers include 1,3-butadiene, isoprene, 2-chloro-1,3-butadiene, and the like. Examples of such alkyl acrylates include methyl acrylate, ethyl acrylate, n-propyl acrylate, sec-butyl acrylate, n-butyl acrylate and the like. Maximum concentrations of these monomers are governed primarily by the temperature to be reached by the coating during the coating process and the degree to which a particular monomer lowers the softening point of the resulting copolymer. For illustration, if a copolymer of styrene and butadiene prepared by a typical emulsion polymerization is to be used as the plastic pigment, butadiene normally is not present in the copolymer at more than about 20 per cent by weight. If, however, the copolymerization is carried out under conditions which promote more than the normal amount of crosslinking, butadiene, in the previous illustration, may be present in concentrations somewhat greater than 20 per cent. Increased crosslinking is usually promoted by irradiation or by use of a crosslinking agent. Hence, monomers which promote crosslinking such as divinyl benzene may also be copolymerized in the plastic material.

Smaller amounts of $\alpha,\beta$-ethylenically unsaturated carboxylic acids may also be copolymerized constituents of the plastic pigments. Examples of the carboxylic acid monomers are acrylic acid, methacrylic acid, maleic acid, itaconic acid, fumaric acid and the like. Maximum concentrations of these acid monomers are limited by the degree to which they promote water solubility to the plastic material. Usually for the plastic pigments required for this invention, the acid monomers are used in quantities not greater than about 5 per cent of the total copolymer weight of the pigment.

The specific gravity of the polymers operable in the practice of the invention usually is within the range of about 0.9 to 1.6. In order that the coating be considerably lighter in weight than coatings containing inorganic pigments, it is preferable that the particles be made from a polymer which is predominantly hydrocarbon since such polymers have a specific gravity generally less than about 1.2.

These particles may be prepared by emulsion polymerization of a suitable monomer or mixture of such monomers or by emulsifying a suitable polymer produced by another method such as bulk or solution polymerization. For example, in a typical emulsion polymerization procedure the monomeric components of the polymer are dispersed in an aqueous solution containing an emulsifier and an electrolyte, a water soluble free radical type catalyst is added to the dispersion to initiate the polymerization, and the mixture is agitated until the polymerization is completed. The size of the particles is controlled by known means such as varying the amount of emulsifier and electrolyte in the system. For example, as the amount of emulsifier is increased, the particle size is decreased. The amount of emulsifier and electrolyte needed to give a particle having the proper size may vary according to the particular polymer being formed.

Suitable binders for the practice of the present method include the natural binders such as starch, modified starch, soy bean protein and casein and commonly known synthetic binders. Suitable modified starch binders include oxidized, enzyme converted, or hydroxy-ethylated starch.

Suitable synthetic binders include the styrene butadiene latexes; the acrylic resin emulsions, especially such aqueous dispersions of polymers which include a small amount of a copolymerized ethylenically unsaturated carboxylic acid; the latexes of copolymers of butadiene and acrylonitrile, vinyl acetate and the acrylates, butadiene and methyl methacrylate, vinyl chloride and vinylidene chloride, and the like; and homopolymers of butadiene, methyl methacrylate, vinyl acetate, chloroprene, vinyl chloride, butyl methacrylate, and the like, as well as polymeric materials which are at least partially soluble in aqueous media such as polyvinyl alcohol.

The coating described in this teaching may be prepared by dispersing the plastic particles in an aqueous medium containing the binder or by blending the emulsion polymerizate with the aqueous media containing the binder, thus eliminating the step of separating the particles from the polymerization mixture. Generally, suitable ratios of binder to plastic pigment in the coating range from about 2 parts to 17 parts of binder, dry basis, to 38.5 parts of hydrocarbon plastic particles, calculated on a solids basis. The preferred ratios range from 10 to 15 parts of binder to 38.5 parts of plastic particles. The particular value of 38.5 parts by weight of plastic pigment is used since this amount of a solid hydrocarbon plastic pigment is approximately equivalent on a volume basis to 100 parts by weight of the paper coating grade of clay. If plastic particles are used whose specific gravity is considerably less than 0.9 to 1, for example, highly porous hydrocarbon plastic particles, or if non-hydrocarbon particles having considerably higher specific gravities, such as polyvinyl chloride, are used, appropriate adjustments can be made in this weight ratio to provide an approximately equivalent volume of pigment.

When so desired an admixture of an inorganic material such as clay and the plastic particles may be used as the coating pigment.

The coating is applied to a paper substrate by a conventional technique such as air knife, trailing blade, inverted blade, roll coater and the like.

After the coating is applied, the surface of the substrate is dried and often is then finished by calendering or supercalendering. It is critical that the temperature of the coating does not exceed the softening point of the plastic particles, otherwise the particles will lose their discrete character or proper size and shape. When this occurs, the opacity and brightness of the coated surface drops substantially.

The drying times required by the coating containing the plastic particles are not as long as those required by coatings containing the inorganic pigments. Also the paper substrate coated with the plastic particles has a better finish and higher visual gloss than paper coated with an inorganic pigment.

Where the solvent sensitivity of a specific plastic pigment presents a problem, a coating containing the plastic pigment may be applied to the paper substrate as a base coating and such base coating is subsequently coated with a coating containing an inorganic pigment which is not as sensitive to solvents. Since by that procedure much less coating containing the inorganic pigment will be required to yield a surface with the desired gloss and opacity, the total coating weight is usually reduced about 25 per cent.

The following examples illustrate the invention, but are not to be construed as limiting its scope. Except as indicated, all parts and percentages are by weight.

EXAMPLE 1

A blend is prepared of an aqueous dispersion of oxidized starch and a latex of polystyrene having an average particle size of 0.5 micron, as determined by electron microscope, in a ratio of 15 parts of starch and 38.5 parts of polystyrene particles calculated on a solids basis, and the solids content of the blend is adjusted to 43.5 per cent. The mixture is then applied with a drawdown bar to a polished black glass plate and air dried at room temperature. Five square inches of the applied coating is removed and weighed. This weight is compared with the weight of a coating applied in the same manner but containing kaolin clay having a solids content of 51.5 per cent. In each test sufficient coating was applied to achieve a brightness of 70. The results of this comparison are shown in the following table.

TABLE I

| | Parts by weight dry basis* | Parts by weight dry basis |
|---|---|---|
| Polystyrene Pigment | — | 38.5 |
| Kaolin clay | 100 | — |
| Starch, oxidized | 15 | 15 |
| Coating weight, grams/5 sq. inches | 0.122 | 0.069 |

*Not an example of the invention
Brightness is determined by TAPPI Test Method T452-M-58.

EXAMPLE 2

A coating color, hereinafter designated II, is made according to Example 1, containing 10 parts by weight on a dry basis of oxidized starch and 38.5 parts by weight on dry basis of latex of polystyrene having a particle size of 5000 Angstroms is applied to a paper substrate by a puddle type trailing blade, double coated with drying in a circulating oven after each coat. A coating color (not an example of the invention), hereinafter designated II(C), containing 100 parts by weight on dry basis of kaolin clay and 15 parts by weight on dry basis of oxidized starch is similarly applied to a second portion of the same paper substrate. The results are shown in the following table for comparison purposes.

TABLE II

PILOT COAT DATA

| | II(C)* | II |
|---|---|---|
| Polystyrene "Pigment" | — | 38.5 |
| Kaolin Clay | 100 | — |
| Starch | 15 | 10 |
| % Solids | 57.5 | 43.5 |
| Coating Speed | 600 ft/min | 600 ft/min |
| Oven Temperatures | 300°F | 300°F |
| Coating Properties (supercalendered 6 nips at 1200 pli) | | |
| 75° Gloss¹ | 43 | 56 |
| Brightness² | 74.5 | 77 |
| Opacity³ | 92.7 | 91.6 |
| K&N Ink, % Drop⁴ | 34.3 | 52 |
| IGT Dry Pick⁵ No. 6 Ink (ft/min.) | 270 | 280 |
| Coating Weight lb./ream (25 × 38–500) | 8.3 | 3.9 |

* Not an example of the invention
¹Gloss is determined by TAPPI Test Method T480TS-65.
²Brightness is determined by TAPPI Test Method T452-M-58.
³Opacity is determined by TAPPI Test Method T425-M-60.
⁴K&N Ink is measured according to TAPPI Test Method RC 19.
⁵IGT Picking Resistance is measured according to TAPPI Test Method T499 su 64.

EXAMPLE 3

A single base coating color of composition II of Example 2 is applied to a portion of the same paper substrate used in Example 2 by a puddle type trailing blade. This base coating is dried and then a single finish coating of composition II(C) of Example 2 is applied to the dry base coating by a puddle type trailing blade. The results, obtained by the same testing methods used in Example 2, are shown in the following table.

TABLE III*

| | |
|---|---|
| 75% Gloss | 33 |
| Brightness | 74.5 |
| Opacity | 93.3 |
| K&N Ink, % Drop | 43 |
| IGT Dry Pick No. 6 Ink (Ft/min.) | 300 |
| Coating Weight Lb/ream (25 × 38–500) | 6.0 |

* The same testing methods used in Example 2 are used in this example.

EXAMPLE 4

Substantially the same results are obtained when for the polystyrene pigment of Example 2 there is substituted the same quantity of a copolymer of 92 per cent of styrene, 6 per cent of acrylonitrile, and 2 per cent of itaconic acid in the form of approximately spherical particles having an average diameter of about 5000 Angstroms.

EXAMPLE 5

Substantially the same results are obtained when for the polystyrene pigment of Example 2, there is substituted the same quantity of a copolymer of 89 per cent by weight of styrene, 6 per cent by weight of acrylonitrile, 3 per cent by weight of β-hydroxyethyl acrylate and 2 per cent by weight of itaconic acid in the form of approximately spherical particles having an average diameter of about 5,000 Angstroms.

What is claimed is:

1. A coated paper comprising a paper substrate having intimately adhered thereto an improved coating comprising from about 2 to about 17 parts by weight a binder selected from the group consisting of starch, modified starch, protein, casein, latex of styrene/butadiene copolymer, polyvinylacetate and polyvinyl alcohol and about 38.5 parts by weight of a pigment, at least a portion of said pigment being in the form of discrete, substantially spheroidal, water-insoluble, substantially colorless, thermoplastic, resinous organic polymer particles having an average diameter of from about 0.3 to about 0.8 micron and the remainder of said pigment being clay, said portion of organic polymer particles being sufficient in said coating to render it measurably lighter in weight than a coating in which the pigment is entirely clay, said organic polymer selected from the group consisting of polystyrene, and copolymers of styrene containing up to 20 weight percent of acrylonitrile and up to 5 weight percent of an ethylenically unsaturated carboxylic acid selected from the group consisting of acrylic acid, methacrylic acid, and itaconic acid.

2. A coated paper comprising a paper substrate and a coating comprising from about 2 to about 17 parts by weight of a binder selected from the group consisting of starch, modified starch, soybean protein, casein, latex of styrene/butadiene copolymer, latex of butadiene/acrylonitrile copolymer, latex of butadiene/methyl methacrylate copolymer, latex of vinyl chloride/vinylidene chloride copolymer, polybutadiene, poly(methyl methacrylate), poly(vinyl acetate), poly(chloroprene), poly(vinyl chloride) and poly(butyl methacrylate) and about 38.5 parts by weight of pigment in the form of discrete, substantially spheroidal, water-insoluble, substantially colorless, thermoplastic, resinous organic polymer particles having an average diameter of from about 0.3 micron to about 0.8 micron, said organic polymer being a polymer selected from the group consisting of homopolymers of monovinylidene aromatic monomer and copolymers of monovinylidene aromatic monomer and up to 5 weight percent of an $\alpha,\beta$-ethylenically unsaturated carboxylic acid selected from the group consisting of acrylic acid, methacrylic acid, itaconic acid, maleic acid and fumaric acid, and copolymers of monovinylidene aromatic monomer, up to 20 weight percent of a copolymerizable monomer selected from the group consisting of butadiene, isoprene, methyl acrylate, ethyl acrylate, propyl acrylate, butyl acrylate, and acrylonitrile and up to 5 weight percent of said $\alpha,\beta$-ethylenically unsaturated carboxylic acid.

* * * * *